United States Patent [19]

Baüer

[11] Patent Number: 4,657,342

[45] Date of Patent: Apr. 14, 1987

[54] FLEXIBLE POWER CABLE WITH PROFILED CORE AND SUPPORT MEMBER

[75] Inventor: Albert Baüer, Neustadt, Fed. Rep. of Germany

[73] Assignee: Siemens Aktiengesellschaft, Munich, Fed. Rep. of Germany

[21] Appl. No.: 651,293

[22] Filed: Sep. 17, 1984

[30] Foreign Application Priority Data

Sep. 27, 1983 [DE] Fed. Rep. of Germany ....... 3335325

[51] Int. Cl.⁴ ................................................ G02B 6/44
[52] U.S. Cl. ................. 350/96.23; 350/96.10; 174/115; 174/70 S
[58] Field of Search ................... 350/96.23; 174/70 S, 174/115, 70 L, 68 R, 116

[56] References Cited

U.S. PATENT DOCUMENTS

| | | | |
|---|---|---|---|
| 3,699,238 | 10/1972 | Hansen et al. | 174/115 |
| 3,980,808 | 9/1976 | Kikuchi et al. | 174/70 R X |
| 4,002,820 | 1/1977 | Paniri et al. | 174/115 |
| 4,365,865 | 12/1982 | Stiles | 174/70 R X |
| 4,552,432 | 11/1985 | Anderson et al. | 350/96.23 |

Primary Examiner—William L. Sikes
Assistant Examiner—Akm E. Ullah
Attorney, Agent, or Firm—Kenyon & Kenyon

[57] ABSTRACT

A flexible power cable includes three current carrying conductors and three further stranding elements arranged in the corner spaces twisted about a profiled core which contains a steel cable as the support member of the cable. The profiled core includes a round strand containing a steel cable and of three profiled strands radially adjacent thereto, each of which can contain a support member and/or an electric conductor.

8 Claims, 2 Drawing Figures

FLEXIBLE POWER CABLE WITH PROFILED CORE AND SUPPORT MEMBER

BACKGROUND OF THE INVENTION

This invention relates to flexible power cables in general and more particularly to profiled cores such as are used, in particular, in the design of heavy rubber cables for the mechanical stabilization of the cable.

In the mechanical design of rubber flexible cables which can be wound on drums, i.e., are forcibly guided, it is customary to strand the conductors of the cable about a profiled core, by means of which the conductors are fixed relative to each other in their position in space. As a result, the mechanical stability of the cable is improved. The use of a profiled core is customary especially in four conductor cables, in which the neutral conductor with its full electrical cross section forms the fourth conductor. If the cable is subjected to special tensile stresses, a support member, for instance, a steel cable can be disposed in the profiled core (DER ELEKTRIKER 11/77, page 285; "Der Elektromeister", 11/79, page 933).

The use of a profiled core is also known for power cables in which three current carrying conductors form the stranded assembly of the cable and in which further stranding elements are arranged in the corners between these conductors. In one known trailing cable, for this purpose, the neutral conductor is divided into two stranding elements, while a third stranding element is formed by two auxiliary conductors which are twisted with each other and are surrounded by a round jacket (DE-AS No. 10 28 644). In a further known mining cable, the neutral conductor is divided into thirds. The three conductors of the neutral conductor and the three current carrying conductors are twisted about a profiled core, the cross section of which has three arms and has circularly inward curved outside surfaces which correspond to the conductor. The core contains a pilot conductor in the center. Through the use of nylon yarn the pilot conductor has a certain amount of tensile strength. To increase the tensile strength of the cable as a whole, a braid of nylon threads is arranged between the inner and the outer jacket (U.S. Pat. No. 4,002,820).

For adapting heavier flexible cables to more recent developments in the field of signal transmission, it is otherwise known to arrange a stranding element which contains optical transmission elements in the outer corners of such a cable (DE-OS No. 28 01 231).

When using profiled cores which contain a steel cable as the support member of the cable, it has sometimes been found difficult, in twisting the cable core, to torsion the steel cable an amount equal to the twisting pitch of the conductors. Taking this difficulty into consideration, it is an object of the present invention, starting out from a power cable with conductors twisted about a profiled core, to design a power cable, comprising three current carrying conductors and three further stranding elements arranged in the corner spaces, in such a manner that it can be included, without difficulty, into the stranding process of the conductors and stranding elements and nevertheless ensures a secure fixation of the conductors and the stranding elements relative to each other.

SUMMARY OF THE INVENTION

To solve this problem, according to the present invention, the profiled core consists of a round strand containing the steel cable and of three profiled strands radially adjacent thereto The cross section of the profiled strands is in the shape of a regular rectangle with circularly inwardly curved lateral edges for receiving the three current carrying conductors as well as the three further stranding elements.

In such an embodiment of the profiled core, the steel cable can pass through the stranding operation without being torsioned during the manufacture of the cable. Only the adjacent profiled strands are then torsioned. These strands offer no appreciable resistance to this mechanical deformation since they consist of rubber. The subdivision of the profiled core into a strand containing the steel cable and into three profiled strands further presents the possibility of embedding high tensile strength elements into the profiled strands for instance, as manufacturing aids, and/or embedding electric conductors. The profiled strands therefore can at the same time form a conductor which can be used for control or monitoring purposes.

The described embodiment of the profiled core is especially suitable for three conductor high voltage cables, in which a stranding element for signal or control purposes is arranged in one of the corners and in which, consequently, the neutral conductor is divided over the other two corner spaces. In this case, the three current carrying conductors must be spaced from each other by appropriate design of the profiled core by a large enough distance that the three stranding elements arranged in the corner spaces of the conductors are within the circumferential circle of the three current carrying conductors.

DETAILED DESCRIPTION

Figure 1:
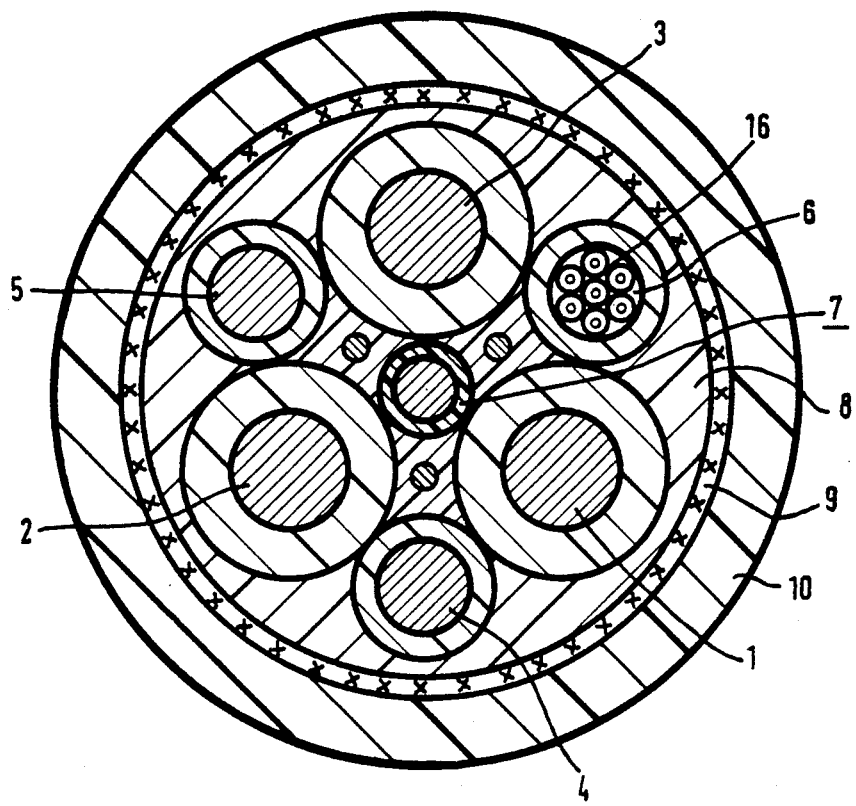
FIG. 1 is an example of the new power cable shown in cross section.

The heavy flexible cable shown in cross section in FIG. 1 is a cable for supplying power to the drive units of a lifting device. The cable consists of the three current carrying conductors 1, 2 and 3 which are stranded, together with stranding elements 4, 5 and 6 about a profiled core 7 to form the cable 4. The stranded assembly as a whole is surrounded by an inner jacket 8, a braid 9 and an outer jacket 10. The stranding elements 4 and 5 are a halved neutral conductor, while the stranding element 6 contains optical transmission elements 16 which are similar to the stranding element described in DE-OS No. 28 01 231.

Figure 2:
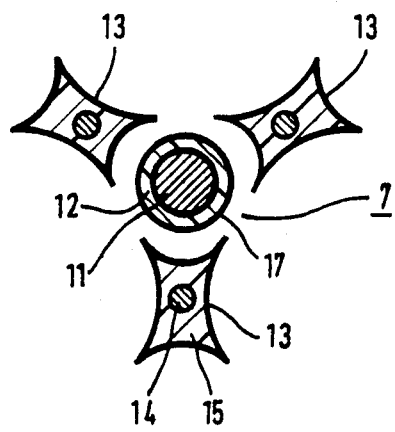
FIG. 2 is a separate view of the corresponding profiled core.

According to FIG. 2, the support member, i.e., the core, includes a round strand 17 and three profiled strands 13. The round strand 17 contains a steel cable 11 which is provided with a rubber jacket. Each profiled strand 13 has the cross section of a regular rectangle with circularly inwardly curved lateral edges. The curvature of the longer lateral edges is matched to the roundness of the current carrying conductors 1; the curvature of the lateral inside edge is matched to the roundness of the the strand 17 containing the steel cable 11; and the curvature of the outer narrow lateral edge is matched to the roundness of the stranding elements 4 to 6. Each profiled strand 13 contains an electric conductor 14. The profiled strand 13 consists of insulating rubber 15 and thereby forms at the same time the insulation of the conductors 14. It is also possible to embed insulated conductors in the profiled strands; in such a case the profiled strands can also consist of electrically conducting rubber. Unless the profiled strands 13 contain an electric conductor, it is advisable to embed a high tensile strength element, for instance, a high tensile strength plastic filament which takes up, during twisting of the profiled strands, the tensile stresses occurring in the process.

The cable shown in FIG. 1 is a high voltage cable, in which the conductors 1, 2 and 3 are provided with an outer conducting rubber layer, not shown in detail. The conductors 4 and 5 containing the protective conductor are likewise provided with a conducting rubber layer, as is the stranding element 6.

What is claimed is:

1. In a flexible power cable with conductors twisted about a profiled core, in which the profiled core contains a steel cable as a support member for the cable, the improvement comprising: a profiled core which includes a round strand containing a steel cable and three profiled strands disposed radially thereto adjacent, the cross section of said adjacent profiled strands shaped as a regular rectangle with circularly inwardly curved lateral edges; three current carrying conductors received in said inwardly curved lateral edges of said adjacent strands, said conductors forming, with said strands, at the outer ends of said adjacent strands, a total of three corner spaces one between each two current carrying conductors; and three further stranding elements arranged in the three corner spaces.

2. A power cable according to claim 1, wherein each of said profiled strands contains a support member.

3. A power cable according to claim 2, wherein one or more profiled strands contain an electric conductor.

4. A power cable according to claim 1, wherein one or more profiled strands contain an electric conductor.

5. A power cable according claim 4, wherein the stranding elements in two corner spaces comprise a halved protective conductor and in the third corner space, a stranding element with optical transmission elements.

6. A power cable according claim 3, wherein, the stranding elements in two corner spaces comprise a halved protective conductor and in the third corner space, a stranding element with optical transmission elements.

7. A power cable according claim 2, wherein the stranding elements in two corner spaces comprise a halved protective conductor and in the third corner space, a stranding element with optical transmission elements.

8. A power cable according claim 1, wherein the stranding elements in two corner spaces comprise a halved protective conductor and in the third corner space, a stranding element with optical transmission elements.

* * * * *